Jan. 11, 1938. F. T. SMITH ET AL 2,105,058
NEST
Filed Oct. 21, 1936 2 Sheets-Sheet 1
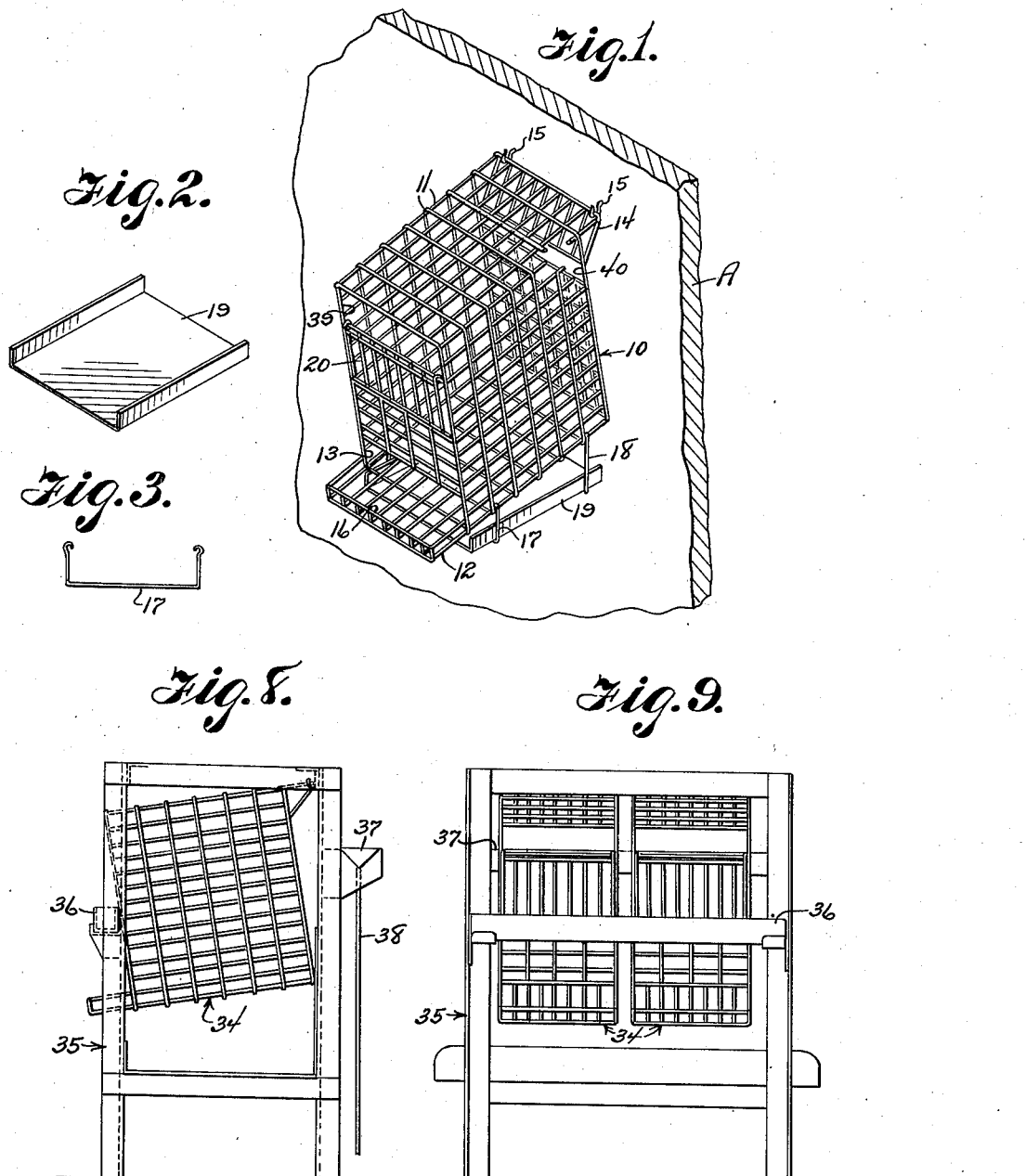
Frederick T. Smith
Wilbert S. Smiley
INVENTORS Jan. 11, 1938.   F. T. SMITH ET AL   2,105,058
NEST
Filed Oct. 21, 1936   2 Sheets-Sheet 2
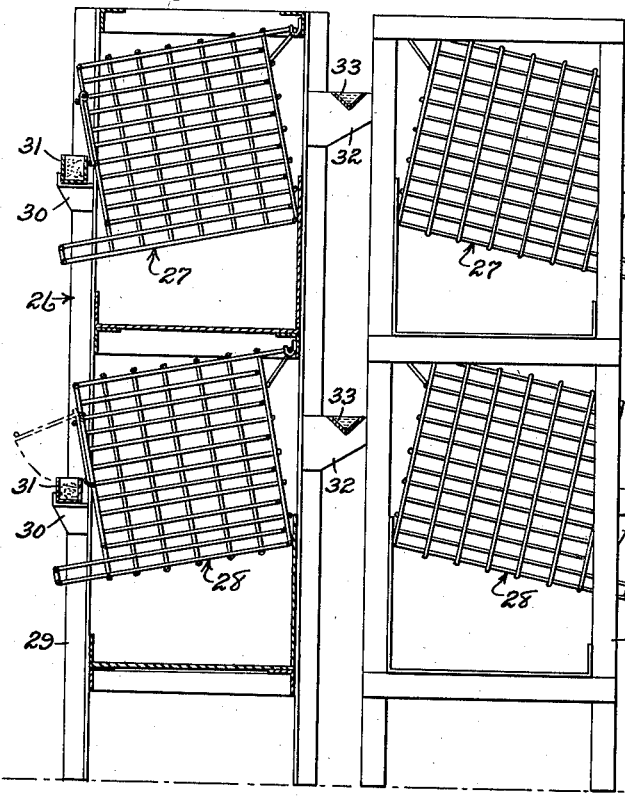
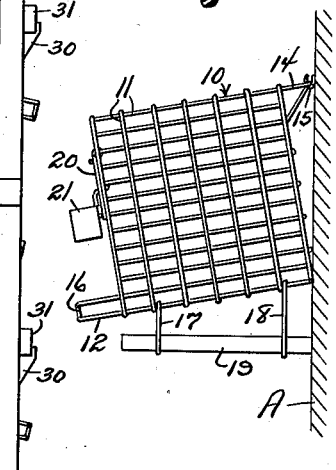
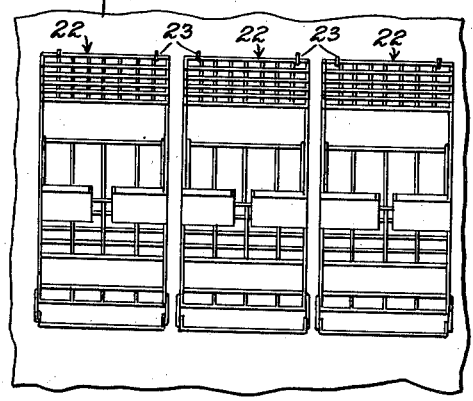
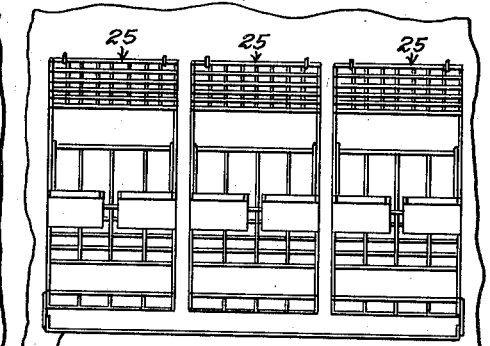
Frederick T. Smith
Wilbert S. Smiley
INVENTORS
BY Victor J. Evans & Co.
ATTORNEYS Patented Jan. 11, 1938

2,105,058

UNITED STATES PATENT OFFICE 2,105,058

NEST

Frederick T. Smith and Wilbert S. Smiley, Woodville, Pa.

Application October 21, 1936, Serial No. 106,888

1 Claim. (Cl. 119—48)

The invention relates to chicken coops and more especially to individual chicken cages or egg laying nests.

The primary object of the invention is the provision of a cage or nest of this character, wherein the same can be individually hung upon a support or within a frame and will assure the rolling of the egg when laid without the cage so that it can be collected with ease and dispatch and such cage is thoroughly sanitary in that the droppings are caught upon a pan outside of the cage, this pan being readily removable for cleaning purposes.

Another object of the invention is the provision of a cage of this character, wherein one or a group thereof can be conveniently hung for use and each cage is independent of the other and is readily removable should the occasion require, there being water and feed troughs conveniently arranged and the said feed trough serving to hold the main or front door of the cage closed and fastened to avoid the escape of a hen when occupying the said cage and wherein an egg when laid will roll to a point where the same can be readily collected without disturbing the hen within the cage.

A further object of the invention is the provision of a cage of this character, wherein the construction thereof is novel in form and is individual in kind.

A still further object of the invention is the provision of a cage of this character, which is simple in construction, thoroughly reliable and effective in its operation, comparatively light in weight yet strong, durable, and inexpensive to manufacture.

With these and other objects in view, the invention consists in the features of construction, combination and arrangement of parts as will be hereinafter more fully described, illustrated in the accompanying drawings, which disclose the preferred and modified forms of embodiment of the invention and pointed out in the claim hereunto appended.

In the accompanying drawings:

Figure 1 is a perspective view of a portion of a wall showing a cage constructed in accordance with the invention hung therefrom.

Figure 2 is a perspective view of the pan for droppings from the cage.

Figure 3 is an elevation of one of the hangers for said pan.

Figure 4 is an end elevation showing a feeding trough connected with the cage.

Figure 5 is a front elevation of a slight modification.

Figure 6 is a view similar to Figure 5 showing a further modification.

Figure 7 is an end elevation partly in section of a stand involving a further modification.

Figure 8 is an end elevation of a further modification.

Figure 9 is a front view of the same.

Similar reference characters indicate corresponding parts throughout the several views in the drawings.

Referring to the drawings in detail, A designates generally a portion of a vertical wall for an enclosure and upon this wall is hung the cage constituting the present invention and hereinafter fully described.

The cage constituting the present invention comprises a body 10 formed from lengths of spaced wires 11, these crossing each other and at the points where the same are crossed are suitably united with each other to effect the body fabric. The body 10 at its bottom is extended beyond the front thereof to form an egg rack 12 which protrudes the required distance forwardly of the front of said body while the front of this body next to its bottom is formed with an opening 13 so that eggs when laid by a hen within the body when contacting with the bottom can roll through the opening 13 into the rack 12 by gravity in a manner presently described.

Formed at the back of the body 10 next to the top thereof is a substantially triangular shaped rearward extension 14 which is adapted for engagement with a pair of spaced fasteners or hooks 15 carried by the wall A and this extension 14 causes the body 10 when hung upon the fasteners or hooks 15 to incline outwardly from the wall A thus disposing the bottom of said body at a forward inclination and when an egg is laid by a hen within the body 10 it will roll upon the bottom through the opening 13 into the rack 12 which is provided with the marginal ledge 16 for retaining the egg when received therein. Thus the egg or eggs within the rack 12 can be conveniently and easily collected without disturbing a hen within the body 10. This body 10 can be readily detached from the fasteners or hooks 15 when the occasion requires.

Detachably fastened to the bottom of the body 10 is a pair of front and rear suspension yokes or hangers 17 and 18, respectively, in which is accommodated a pan 19 for droppings from within the body 10. The pan is slidably and removably fitted in the hangers 17 and 18 to be suspended in a horizontal plane when the body 10 is hung upon the wall A as is clearly shown in Figure 1 of the drawings.

The body at its front is provided with a vertically swinging door 20 and this door when the body is hung from the wall A is maintained closed and latched by a releasable feeder trough 21 detachably fastened at the front of said body 10, the trough being shown in Figure 4 of the drawings attached to the body 10 and overlying the door 20. The contents of the trough 21 can be conveniently reached by a hen when within the body 10.

In Figure 5 of the drawings there is shown a slight modification, wherein a series of cages 22 are hung side by side from a wall B upon hooks 23, these disposed in a horizontal row and carried by said wall.

In Figure 6 of the drawings there is shown another modification, wherein a pan 24 is common to the series of cages 25 thus affording a single pan for the series of said cages 25 and this pan traps the droppings from the respective cages.

In Figure 7 of the drawings there is shown a further modification, wherein a stand 26 supports within it upper and lower cages 27 and 28, respectively. This stand 26 is duplex in kind to provide double tiers and at the front of each tier on the uprights 29 thereof are brackets 30 for removably supporting feed troughs 31, these being disposed next to the fronts of the upper and lower cages 27 and 28 and functioning to hold the doors of such cages closed similarly to the trough 21 shown in Figure 4 of the drawings. Between the tiers are brackets 32 for accommodating water troughs 33, these serving for both upper and lower series of cages 27 and 28 for watering purposes.

In Figures 8 and 9 of the drawings there is shown a still further modification of the invention, wherein a single horizontal row of cages 34 is hung within a stand 35 which is adaptable for accommodating the single horizontal row of said cages and carries at its front the feed trough 36 and at the rear a water trough 37, the latter being equipped with an overflow or drain pipe 38.

The cages before described are individual in that any selected cage can be removed from its support without disturbing the remaining cages and such cage is thoroughly sanitary.

It is preferable to provide at the front and back of the body 10 of each cage openings 39 and 40, respectively, the latter being for enabling the hen within the cage to acquire water from the trough 33 while the opening at the front 39 allows unobstructed view within the cage from the front thereof.

What is claimed is:

A cage of the character described comprising a reticulated body having sides, bottom, top, front and back, respectively, the said front being with an opening next to the bottom, a rack extending from the bottom forwardly of the front beneath the opening therein, an extended top and back at the rear uppermost portion of the body and constituting a substantially triangular shaped formation across the said body, means engageable with the said formation for the hanging of the body upon a support to have the entire bottom forwardly inclined with respect to the perpendicular when upon the support, a pan outside of the body beneath its bottom and disposed horizontally, a feed trough removably supported at the front of said body, a door at the front of the said body and held closed by said feed trough, the back of said body beneath the said formation being provided with an opening, and a watering trough supported next to said last-mentioned opening for access therethrough.

FREDERICK T. SMITH.
WILBERT S. SMILEY.